United States Patent Office 3,457,306
Patented July 22, 1969

3,457,306
PREPARATION OF ORGANOTHIOPHOSPHORUS HALIDES
Joseph W. Baker, Kirkwood, and Raymond E. Stenseth, St. Louis, Mo., assignors to Monsanto Company, St. Louis, Mo., a corporation of Delaware
No Drawing. Filed Dec. 22, 1965, Ser. No. 515,721
Int. Cl. C07f 9/42, 9/20
U.S. Cl. 260—543                     11 Claims

ABSTRACT OF THE DISCLOSURE

Process for the preparation of organophosphonothioic dihalides [RP(S)X$_2$] and diorganophosphinothioic halides [R$_2$P(S)X$_2$] which comprises heating a compound of the formula (RS)$_{(2-n)}$PX$_{(1+n)}$ at a temperature above about 200° C. in the presence of a halide catalyst wherein R is hydrocarbyl of not more than 18 carbon atoms and X is halogen.

---

This invention relates to an improved process for the preparation of compounds of phosphorus and more particularly to an improved process for the preparation of organophosphonothioic dihalides and diorganophosphinothioic halides.

Organophosphonothioic dihalides and diorganophosphinothioic halides have been prepared heretofore by the thermal rearrangement of organothiophosphorodihalidites, di(organothio)phosphorohalidites and mixtures thereof in the liquid or vapor phase at a temperature above about 200° C. This thermal rearrangement process, which is disclosed and claimed in copending application Ser. No. 515,765, can be represented by the following nonstoichiometric expressions (a) 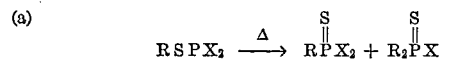

(b) 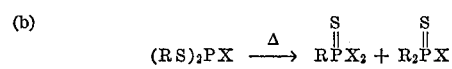

(c) 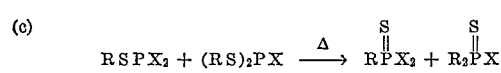

wherein R and X are as defined above. In accordance with the above represented reactions, the process of this invention results in the concomitant production of organophosphonothioic dihalides [RP(S)X$_2$] and diorganophosphinothioic halides [R$_2$P(S)X]. In reaction (a) above the organophosphonothioic dihalides generally comprise a major amount of the product phosphorus compounds whereas in reaction (b) above the organophosphonothioic dihalides generally comprise a major amount of the product phosphorus compounds. Thus, in reaction (c) above, the ratio of organophosphinothioic dihalide to diorganophosphinothioic halide in the product phosphorus compounds depends upon the ratio of the RSPX$_2$ and (RS)$_2$PX reactants. In said process the yield is often uneconomical unless the liquid phase thermal rearrangement is carried out at high temperatures for long periods of time.

Accordingly, an object of this invention is to provide an improved liquid phase process for the preparation of organophosphonothioic dihalides, diorganophosphinothioic halides, and mixtures thereof. Other objects will be apparent from a consideration of the following disclosure.

The above and other objects of this invention are accomplished by carrying out the thermal rearrangement of organothiophosphorodihalidites, di(organothio)phosphorohalidites and mixtures thereof in the presence of a halide catalyst. The use of a halide catalyst in accordance with this invention materially accelerates reaction rate, results in improved yield, and allows the liquid phase thermal rearrangement to be carried out economically at substantially lower temperatures and shorter reaction periods than were heretofore possible. Moreover, the use of a halide catalyst is advantageous since corrosion of reaction equipment is substantially reduced when the thermal is carried out at lower temperatures.

In accordance with this invention, phosphorus compounds selected from the group consisting of (a) compounds of the formula

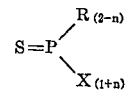

wherein R, which can be the same or different, is hydrocarbyl of not more than 18 carbon atoms bonded to the phosphorus atom through a carbon-phosphorus bond, X is halogen (Cl, Br, F and I) and n is an integer from 0 to 1, and (b) mixtures thereof are prepared by the process which comprises heating a compound selected from the group consisting of (a) compounds of the formula

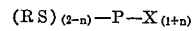

wherein R is hydrocarbyl of not more than 18 carbon atoms and X and n are as defined above, and (b) mixtures thereof at a temperature above about 200° C. in the liquid phase in the presence of a halide catalyst selected from the group consisting of (a) organic halides of the formula (R')$\cdot$X$_m$ wherein R' is hydrocarbyl of not more than 18 carbon atoms selected from the group consisting of alkyl, alkenyl, alkynyl, cycloalkyl and aralkyl, X is halogen (Cl, Br, I and F) and m is an integer from 1 to 3, (b) inorganic halides of the formula MeX$_v$ wherein Me is selected from the group consisting of metal and NH$_4$, X is halogen (Cl, Br, I and F), v is the actual valence of Me and is an integer from 1 to 6 and (c) halogens selected from the group consisting of Cl$_2$, Br$_2$, and I$_2$. Mixtures of the above halide catalysts also can be employed in the process of this invention.

Representative organic halide catalysts of the formula (R')$\cdot$X$_m$ which can be used in this invention include by way of example alkyl halides such as

| | |
|---|---|
| methyl chloride, | 2,3-dichloropentane, |
| methyl iodide, | 3,3-dibromopentane, |
| methyl bromide, | hexyl chloride, |
| methyl fluoride, | hexyl bromide, |
| ethyl chloride, | 2,4-dichlorohexane, |
| ethyl iodide, | 1,3-dibromohexane, |
| ethyl bromide, | 1,3,4-trichlorohexane, |
| ethyl fluoride, | heptyl chloride, |
| dichloroethane, | heptyl bromide, |
| n-propyl chloride, | heptyl fluoride, |
| n-propyl bromide, | 1,3-dichloroheptane, |
| isopropyl iodide, | 1,4,4-trichloroheptane, |
| n-butyl bromide, | 2,4-dichloromethylheptane, |
| sec-butyl iodide, | octyl chloride, |
| tert-butyl bromide, | octyl bromide, |
| 1,3,3-trichlorobutane, | octyl iodide, |
| 1,3,3-tribromobutane, | 2,4-dichloromethylhexane, |
| pentyl chloride, | 2,4-dichlorooctane, |
| pentyl bromide, | 2,4,4-trichloromethylpentane, |
| | 1,3,5-tribromooctane and | the straight and branched chain nonyl,

| | |
|---|---|
| decyl, | hexadecyl, |
| undecyl, | heptadecyl and |
| dodecyl, | octadecyl chloride, |
| tridecyl, | bromides, |
| tetradecyl, | fluorides and |
| pentadecyl, | iodides; | alkenyl halides such as vinyl chloride,
vinyl bromide,
allyl chloride,
allyl bromide,
3,4-dichloromethyl-n-pentylene-1,
3-chloro-n-heptylene-1,
1,3,3-trichloro-n-heptylene-5,
1,3,5-trichloro-n-octylene-6,
2,3,3-trichloromethyl-pentylene-4 and
3-chloro-n-butylene-1,
3-chloro-n-pentylene-1,
4-chloro-n-hexylene-2, the various homologues and isomers of alkenyl halides having 2 to 18 carbon atoms; alkynyl halides such as propargyl chloride, propargyl bromide, propargyl iodide and the various homologues and isomers of alkynyl halides having 3 to 18 carbon atoms; cycloalkyl halides such as chlorocyclopentane, bromocyclopentane, 2,4-dichlorocyclopentane, chlorocyclohexane, bromocyclohexane, 2,4-dichlorocyclohexane, 2,4,5-trichlorocyclohexane, chlorocyclheptane, 2,5-dichlorocycloheptane, 2,4,5-tribromocycloheptane and the like, and aralkyl halides such as benzyl chloride, benzyl bromide, chlorophenylethane, bromophenylethane, 2,4-dichlorophenylethane, 2,4,5-trichlorophenylethane, 2,4,6-tribromophenylethane, di(2,4-dichlorophenyl)methane and the like. The preferred organic halide catalysts of the formula $(R')\!\!-\!\!X_m$ are those wherein R' is alkyl, alkenyl, alkynyl, cycloalkyl or aralkyl having not more than 8 carbon atoms, X is chloride and $m$ is an integer from 1 to 3.

Representative metallic halide catalysts of the formula $MeX_v$ which can be used in this invention include by way of example the halides of Na, K, Ti, Ba, Al, Sb, As, Be, Bi, Cd, Ce, Co, Cu, Ga, Au, In, Fe, La, Pb, Mn, Hg, Nb, Ni, Os, Re, Se, Ag, Ta, Tl, Sn, Zn, and the like.

Specific examples of suitable inorganic halide catalysts of the formula $MeX_v$ include by way of example: $AlBr_3$, $AlCl_3$, $AlF_3$, $DbBr_3$, $SbCl_3$, $SbI_3$, $SbCl_5$, $SbI_3$, $SbI_5$, $AsBr_3$, $AsCl_3$, $NbCl_5$, $NiBr_2$, $NiCl_2$, $NiI_2$, $OsF_6$, $ReCl_3$, $AsF_3$, $AsI_3$, $BeBr_2$, $BeCl_2$, $BeF_2$, $BeI_2$, $BiBr_3$, $BiCl_3$, $BiBr_3$, $BiI_3$, $CdBr_2$, $ReCl_6$, $SeF_4$, $AgBr$, $AgF$, $AgI$, $TaCl_5$, $CdCl_2$, $CdF_2$, $CdI_2$, $CeCl_3$, $CoBr_2$, $CoCl_2$, $CoI_2$, $CuBr$, $CuBr_2$, $CuCl$, $CuCl_2$, $TaBr_3$, $TlCl_3$, $SnBr_2$, $SnCl_2$, $ZnBr_2$, $ZnCl_2$, $CuI$, $GaBr_3$, $GaCl_3$, $GaI_3$, $AuBr$, $AuBr_3$, $AuCl$, $AuCl_3$, $AuI_3$, $InBr_3$, $InCl_3$, $ZnI_2$, $NaCl$, $NaI$, $NaBr$, $KCl$, $NH_4Cl$, $InI_3$, $FeBr_2$, $FeBr_3$, $FeCl_2$, $FeCl_3$, $FeBr_3$, $FeI_2$, $LaBr_3$, $LaCl_3$, $LaI_3$, $PbBr_2$, $KBr$, $SnCl_4$, $TiCl_4$, $TiBr_4$, $TiI_4$, $NH_4I$, $PbCl_2$, $PbI_2$, $MnBr_3$, $MnCl_2$, $MnI_2$, $HgBr_2$, $HgBrI$, $HgCl_2$, $HgF_2$, $HgI_2$, $NbBr_5$, $ReCl_3$, $TaCl_5$, $ZnCl_2$, $KI$, $BaCl_2$, $NH_4Br$.

The amount of catalyst employed is not critical. The exact amount will vary somewhat depending upon the specific catalyst and the specific R group in the phosphorus compounds of the formula $RSPX_2$ and $(RS)_2PX$ to be rearranged. The catalyst is present in a catalytic amount, generally from about 0.0005 mol. to about 0.2 mol. per mol. of phosphorus compounds to be thermally rearranged. However, greater or lesser amounts can be employed. Preferably, the catalyst is present in an amount of at least about 0.005 mol. per mol. of phosphorus compounds to be thermally rearranged.

Representative R hydrocarbon radicals for the compounds of the above formulae prepared by the process of this invention include by way of example alkyl (1 to 18 carbon atoms) such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl and the various homologues and isomers of alkyl having from 1 to 18 carbon atoms, cycloalkyl and alkyl substituted cycloalkyl (3 to 18 carbon atoms) such as cyclopentyl, cyclohexyl, mono- and polymethylcyclohexyl, mono- and polyethylcyclohexyl, cycloheptyl and the like, cycloalkenyl and alkyl substituted cycloalkenyl (3 to 18 carbon atoms) such as cyclopentenyl, cyclohexenyl, cycloheptenyl, mono- and polyethylcyclohexenyl and the like, aryl (6 to 18 carbon atoms) such as phenyl, biphenyl, naphthyl, and the like, aralkyl (7 to 18 carbon atoms) such as benzyl, phenylethyl, diphenylmethyl and the like, alkaryl (7 to 18 carbon atoms) such as tolyl, ethylphenyl, xylyl, butylphenyl, tert-butylphenyl, trimethylphenyl, diethylphenyl, methylpropylethylphenyl and the like.

The thermal rearrangement of this invention can be carried out by heating organothiophosphorodihalidites, di-(organothio)phosphorohalidites or mixtures thereof in the liquid phase at temperatures from about 200° C. to about 350° C. Temperatures below about 200° C. can be used but reaction time is increased substantially at such lower temperatures. Preferably the reaction is carried out at temperatures above about 225° C. from the standpoint of optimum conversion in reasonable reaction periods. The reaction can be carried out at subatomspheric, atmospheric or superatmospheric pressures, the pressure not being critical. The exact reaction conditions, i.e., time, temperature and pressure, will depend upon the specific compounds to be thermally rearranged. The thermal rearrangement can be carried out in the presence of an inert organic medium. Suitable organic media include for example "Decalin," "Tetralin," chlorinated biphenyl and the like.

The separation of the desired phosphorus compound from the product mixture is readily accomplished by conventional means well-known in the art, e.g., fractional distillation under reduced pressure, selective extraction, fractional distillation using a carrier gas, film distillation, elution or any suitable combination of these methods.

The phosphorus compounds prepared by the thermal rearrangement of this invention and numerous uses therefor are well-known in the art. These compounds are useful as fire retardants and rust inhibitors, and as chemical intermediates in the preparation of petroleum additives, agricultural chemicals, organophosphorus polymers and other products of commercial interest. For example, valuable lubricity additives for lubricating oils can be prepared by reacting phosphorus compounds prepared by the process of this invention with phenol at temperatures from about 80° C. to about 150° C. in the presence of an acid acceptor in accordance with the following equations

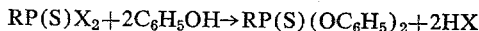
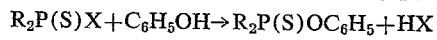

$$RP(S)X_2 + 2C_6H_5OH \rightarrow RP(S)(OC_6H_5)_2 + 2HX$$

$$R_2P(S)X + C_6H_5OH \rightarrow R_2P(S)OC_6H_5 + HX$$

wherein R and X are as defined above.

The following examples will illustrate the invention. Parts and percent are by weight unless otherwise indicated.

EXAMPLE 1

A reaction vessel equipped with stirrer, thermometer, Dry Ice condenser and inlet tube is charged with 549.4 parts of phosphorus trichloride. While maintaining the temperature at about 65° C. and stirring, 190.0 parts of methyl mercaptan are introduced into the vessel through the inlet tube below the surface of the liquid over a period of about six hours. After the addition of methyl mercaptan, the reaction mixture is stirred until the evolution of HCl is substantially complete. Nuclear magnetic resonance (NMR) spectrum analysis shows that the product mixture contains, based on the total mols of phosphorus compounds present, 59 mol percent of methylthiophosphorodichloridites and 20 mol percent of di(methylthio)-phosphorochloridites.

EXAMPLES 2 TO 13

The $CH_3SPCl_2$—$(CH_3S)_2PCl$ mixture prepared in Example 1 above is divided into portions and each portion is admixed with a catalyst as given in Examples 2 to 13 except for control Example 2. The reaction mixtures of $CH_3SPCl_2$, $(CH_3S)_2PCl$ and catalyst are sealed in a reaction vessel and heated at 275° C. for eight hours. At the end of this period the vessels are cooled to room temperature and the products removed. The thermally rearranged product mixtures are subjected to gas chromatographic analysis. Results and further details are given in Table I below.

TABLE I

| Ex. | Catalyst | Amount[1] | Product[2] CH₃P(S)Cl₂ | (CH₃)₂P(S)Cl |
|---|---|---|---|---|
| 2 | None | ---- | 43 | 9.1 |
| 3 | I₂ | 0.025 | 66.7 | 7.9 |
| 4 | AlCl₃ | 0.05 | 51.7 | 13.4 |
| 5 | ZnI₂ | 0.05 | 65.0 | 9.3 |
| 6 | CH₃I | 0.05 | 61.1 | 9.2 |
| 7 | ZnCl₂ | 0.05 | 49.6 | 8.9 |
| 8 | ZnBr₂ | 0.05 | 52.5 | 10.8 |
| 9 | KI | 0.05 | 60.2 | 7.3 |
| 10 | NaI | 0.05 | 61.0 | 5.4 |
| 11 | FeCl₃ | 0.05 | 49.9 | 4.7 |
| 12 | TiCl₄ | 0.05 | 48.4 | 9.7 |
| 13 | HgCl₂ | 0.05 | 47.4 | 8.2 |

[1] Catalyst expressed as mol per mol of CH₃SPCl₂+(CH₃S)₂PCl.
[2] Weight percent of total product mixture.

EXAMPLES 14 TO 25

Various reaction mixtures containing compounds of the formula RSPX₂+(RS)₂PX are sealed in a reaction vessel and heated at 275° C. for eight hours in the presence of the catalysts listed in Table II below. At the end of this period the vessels are cooled to room temperature and the products removed. The thermally rearranged product material is subjected to NMR spectrum analysis. In all cases results comparable to those of Examples 3 to 13 above are obtained.

TABLE II

| | Reaction mixture RSPX₂+(RS)₂PX | | | |
|---|---|---|---|---|
| Ex. | R | X | Catalyst | Amount[1] |
| 14 | Ethyl | Cl | Ethylene dibromide | 0.06 |
| 15 | Propyl | Cl | NH₄Br | 0.001 |
| 16 | Hexyl | Br | NH₄Cl | 0.0005 |
| 17 | Dodecyl | I | 1,3,5-triiodopentane | 0.002 |
| 18 | Phenyl | Br | Propargyl bromide | 0.001 |
| 19 | Benzyl | Br | Allyl chloride | 0.005 |
| 20 | Tolyl | Cl | 1-bromo-3-iodocyclohexane | 0.006 |
| 21 | Cycloheptyl | Cl | 2,2-dichlorodecane | 0.001 |
| 22 | Cyclohexyl | Cl | 3-chloromethyl-n-pentylene-1 | 0.007 |
| 23 | Butyl | Br | 2-chlorocyclo heptane | 0.2 |
| 24 | Methyl | I | Benzyl chloride | 0.006 |
| 25 | Heptyl | Cl | Butyl bromide | 0.005 |

[1] Mols of catalyst per mol of phosphorus compounds (RSPX₂+(RS)₂PX) to be rearranged.

The embodiments of the invention in which an exclusive property or privilege is claimed are defined as follows:

1. Process for the preparation of phosphorus compounds selected from the group consisting of (a) compounds of the formula

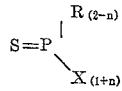

wherein R is hydrocarbyl of not more than 18 carbon atoms selected from the group consisting of alkyl, cycloalkyl, cycloalkenyl, aryl, aralkyl and alkaryl, X is selected from the group consisting of Cl, Br, F and I and $n$ is an integer from 0 to 1, and (b) mixtures thereof which comprise heating a member selected from the group consisting of (a) compounds of the formula $$(RS)_{(2-n)}-PX_{(1+n)}$$

wherein R, X and $n$ are as defined above and mixtures thereof at a temperature from about 200° C. to about 350° C. in the presence of a halide catalyst selected from the group consisting of (1) organic halides of the formula $(R')X_m$ wherein R' is hydrocarbyl of not more than 18 carbon atoms selected from the group consisting of alkyl, alkenyl, alkynyl, cycloalkyl and aralkyl, X is halogen and $m$ is an integer from 1 to 3, (2) inorganic halides of the formula $MeX_v$ wherein Me is selected from the group consisting of Na, K, Ti, Ba, Al, Sb, As, Be, Bi, Cd, Ce, Co, Cu, Ga, Au, In, Fe, La, Pb, Mn, Hg, Nb, Ni, Os, Re, Se, Ag, Ta, Tl, Sn, Zn and NH₄, X is as defined above and $v$ is the valence of Me and is an integer from 1 to 6, and (3) halogens selected from the group consisting of Cl₂, Br₂ and I₂.

2. Process of claim 1 wherein R is alkyl.
3. Process of claim 1 wherein R is aryl.
4. Process of claim 2 wherein R is methyl.
5. Process of claim 3 wherein R is phenyl.
6. Process of claim 1 wherein the halide catalyst is an organic halide.
7. Process of claim 6 wherein the organic halide is methyl iodide.
8. Process of claim 1 wherein the halide catalyst is an inorganic halide.
9. Process of claim 1 wherein R is methyl and the halide catalyst is I₂.
10. Process of claim 1 wherein R is methyl and the halide catalyst is CH₃I.
11. Process of claim 1 wherein R is methyl and the halide catalyst is ZnI₂.

References Cited

UNITED STATES PATENTS 3,078,304  2/1963  Niebergall.
3,184,496  5/1965  Baranauckas et al. ____ 260—969
3,337,658  8/1967  Senkbeil et al. _____ 260—960

OTHER REFERENCES

Kosolapoff: "Organophosphorus Compounds" (1950), pp. 187, 193.

BERNARD HELFIN, Primary Examiner

J. E. EVANS, Assistant Examiner

U.S. Cl. X.R.

46—6; 260—960, 961, 973, 976